United States Patent

Gregory et al.

[11] Patent Number: 5,779,780
[45] Date of Patent: Jul. 14, 1998

[54] INK AND TONER COMPOSITIONS CONTAINING A MIXTURE OF BIS-AZO DYES

[75] Inventors: Peter Gregory, Bolton; John Anthony Taylor, Manchester, both of United Kingdom

[73] Assignee: Zeneca Limited, London, England

[21] Appl. No.: 825,920

[22] Filed: Apr. 2, 1997

[30] Foreign Application Priority Data

Apr. 25, 1996 [GB] United Kingdom ............ 9608487

[51] Int. Cl.$^6$ ............................................ C09D 11/02
[52] U.S. Cl. .............................. 106/31.48; 427/394
[58] Field of Search .................... 106/31.48; 427/394

[56] References Cited

U.S. PATENT DOCUMENTS

| | | | |
|---|---|---|---|
| 4,453,945 | 6/1984 | Miyamoto et al. | 8/543 |
| 4,737,190 | 4/1988 | Shimada et al. | 106/31.48 |
| 5,262,527 | 11/1993 | Gregory et al. | 106/31.48 |

FOREIGN PATENT DOCUMENTS

| | | | |
|---|---|---|---|
| 0 409 778 A1 | 1/1991 | European Pat. Off. | C09B 62/09 |
| 27 40 152 | 3/1978 | Germany | C09B 62/08 |
| 53-117024 | 10/1978 | Japan | C09B 62/08 |
| 60-90265 | 5/1985 | Japan | C09B 62/09 |
| 0 122 423 A1 | 10/1984 | WIPO | C09B 62/09 |
| WO 97/08246 | 3/1997 | WIPO | C09B 62/09 |

OTHER PUBLICATIONS

Research Disclosure 15209, Dec. 1976.

*Primary Examiner*—Helene Klemanski
*Attorney, Agent, or Firm*—Pillsbury Madison & Sutro LLP

[57] ABSTRACT

An ink composition comprising a medium comprising at least one of a low melting point solid, an organic solvent and a mixture of water and one or more water-soluble organic solvent(s); and a mixture of a first, second, third and fourth dye, each of which is of Formula (1) or a salt thereof:

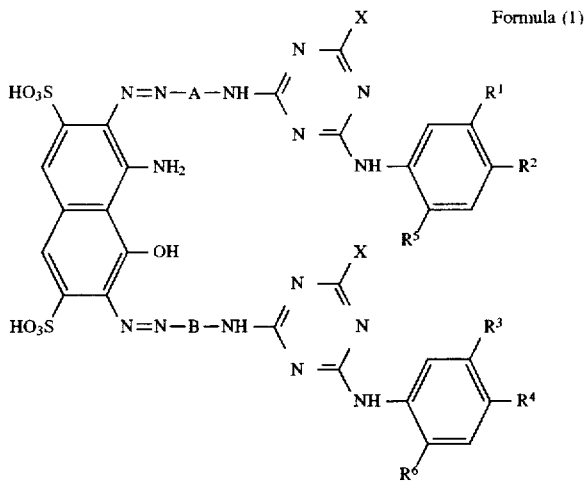

wherein:
  X is a labile or non labile atom or group;
  A and B are each independently an optionally substituted phenylene group;
  one or $R^1$ and $R^2$ is H and the other is sulpho;
  one of $R^3$ and $R^4$ is H and the other is sulpho;
  $R^5$ and $R^6$ are each independently $C_{1-4}$-alkyl.

Also claimed is an ink jet printing process using the inks, a process for ink jet printing textile materials using the inks and a toner containing a mixture of a first, second, third and fourth dyes of the Formula (1).

12 Claims, No Drawings

INK AND TONER COMPOSITIONS CONTAINING A MIXTURE OF BIS-AZO DYES

The present invention relates to compositions and solutions thereof, suitable for use in printing and imaging technologies, especially those suitable for coloration of substrates such as paper, plastics, textiles, metal and glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to the present invention there is provided an ink composition comprising a medium comprising at least one of a low melting point solid, an organic solvent and a mixture of water and one or more water-soluble organic solvent(s); and a mixture of a first, second, third and fourth dye, each of which is of Formula (1) or a salt thereof:

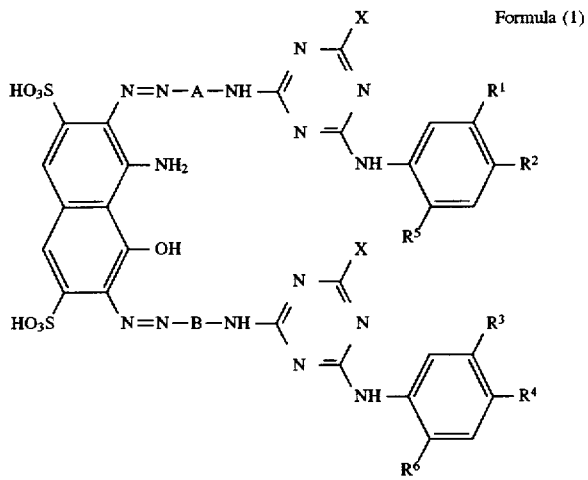

Formula (1)

wherein:

X is a labile or non-labile atom or group;

A and B are each independently an optionally substituted phenylene group;

one of $R^1$ and $R^2$ is H and the other is sulpho;

one of $R^3$ and $R^4$ is H and the other is sulpho;

$R^5$ and $R^6$ are each independently $C_{1-4}$-alkyl; and the first, second, third and fourth dye are different from each other.

The dye of Formula (1) may be in free acid form as shown, but is preferably in the form of a salt with one or more cations. The cations are preferably selected from an alkali metal, ammonium and optionally substituted $C_{1-4}$-alkylammonium cations. Preferred alkali metal cations include lithium, sodium and potassium. A preferred $C_{1-4}$-alkylammonium cation consists of a nitrogen atom having four substituents selected from H, $C_{1-4}$-alkyl and hydroxy-$C_{1-4}$-alkyl, for example mono-, di-, tri- and tetra-($C_{1-4}$-alkyl) ammonium and mono-, di-, tri- and tetra-(hydroxy$C_{1-4}$-alkyl) ammonium. It is preferred that the dye of Formula (1) is a salt with an $NH_4^+$ cation or a mono- or poly-, methyl- or ethylammonium cation or with a mixture of two or more cations, especially a mixture of alkali metal and optionally substituted ammonium cations. Examples of optionally substituted $C_{1-4}$-alkylammonium cations include mono-, di-, tri- and tetra-methylammonium, mono-, di-, tri- and tetra-ethylammonium and mono-, di-, tri- and tetra-(2-hydroxyethyl)ammonium.

A dye of Formula (1) may be converted wholly or partially into its ammonium or optionally substituted $C_{1-4}$-alkyl ammonium salt by dissolving in water the dye of Formula (1) in the form of a salt with an alkali metal, acidifying the solution with a mineral acid, such as hydrochloric acid, separating the precipitating compound in free acid form, suspending it in water, adjusting the pH of the suspension to 9 to 9.5 with ammonia or an optionally substituted $C_{1-4}$-alkylamine to form the water-soluble ammonium or $C_{1-4}$-alkylammonium salt and removing the alkali metal chloride ions by dialysis. Alternatively the alkali metal ion may be exchanged for an optionally substituted ammonium ion by a conventional ion exchange method.

By a labile atom or group it is meant an atom or group which is bound by a chemical bond to the triazine nucleus, which atom or group is displaceable by a hydroxyl group or cellulose under mildly alkaline aqueous conditions to form a covalent bond between the triazine nucleus and cellulose. As examples of such atoms or groups there may be mentioned halogen atoms, for example F and Cl; sulphonic acid groups; thiocyano groups; quaternary ammonium groups, for example trialkylammonium groups and optionally substituted pyridinium groups, for example 3- and 4-carboxy pyridinium groups.

Preferred labile atoms and groups represented by X include a quaternary ammonium group or halo, more preferably 3- or 4- carboxypyridinium, F or Cl, especially Cl.

Preferred non-labile groups represented by X include —$OR^9$, —$SR^9$ or —$NR^7R^8$, wherein $R^7$, $R^8$ and $R^9$ each independently is H, optionally substituted alkyl, cycloalkyl, optionally substituted alkenyl, optionally substituted aryl, optionally substituted aralkyl or $R^7$ and $R^8$ together with the nitrogen atom to which they are attached form a 5 or 6 membered ring. Especially preferred non-labile groups include —OH; —SH; alkoxy, such as methoxy or ethoxy; hydroxy-$C_{2-4}$-alkylamino, such as mono or di-(2-hydroxyethyl)amino; morpholinyl; piperidinyl; piperazinyl; 4-(hydroxy-$C_{2-4}$-alkyl)-piperazin-1-yl, such as 4-hydroxyethylpiperazin-1-yl; 4-($C_{1-4}$-alkyl)piperazin-1-yl, such as 4-methylpiperazin-1-yl; $C_{1-6}$-alkylamino, such as dimethylamino, n-butylamino or n-hexylamino; carboxy-$C_{1-4}$-alkylamino, such as 2-carboxymethylamino; arylamino, such as phenylamino, mono-3- or di-3, 5-carboxyanilino; or aralkylamino, such as benzylamino, mono-3- or di-3,5-carboxyphenylmethylamino. Where X is alkyl or alkoxy these preferably contain from 1 to 4 carbon atoms.

Each of $R^7$, $R^8$ and $R^9$ independently is preferably selected from H, $C_{1-10}$-alkyl especially $C_{1-4}$-alkyl, substituted $C_{1-10}$-alkyl especially substituted $C_{1-4}$-alkyl, phenyl, substituted phenyl, $(CH_2)_{1-4}$-phenyl and substituted $(CH_2)_{1-4}$-phenyl especially benzyl and substituted benzyl. When any one of $R^7$, $R^8$ or $R^9$ is substituted, the substituent is preferably selected from —OH, —CH₃, —OCH₃, —SO₃H and —CO₂H. When R⁷ and R⁸ together with the nitrogen atom to which they are attached form a 5- or 6-membered ring, this is preferably morpholine, piperidine or piperazine especially the latter in which the free ring N-atom may be, and preferably is substituted by a C₁₋₄-alkyl or hydroxy-C₂₋₄-alkyl group.

Preferably A and B are each independently sulphophenylene, more preferably sulpho-1,4-phenylene or sulpho-1,3-phenylene, especially sulpho-1,4-phenylene. The sulpho group is preferably ortho to the azo (—N=N—) group. Preferably A and B are identical to each other.

R⁵ and R⁶ are preferably methyl.

Preferably the first dye is of the Formula (2):

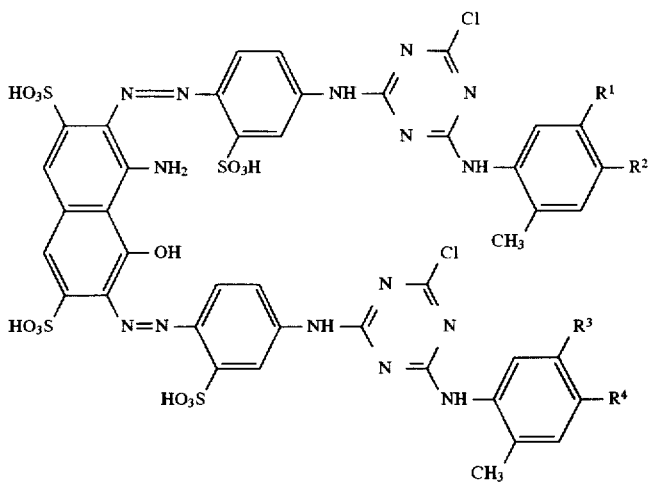

Formula (2)

wherein:

R¹ and R³ are H and R² and R⁴ are sulpho. The second dye is preferably of Formula (2) wherein R¹ and R³ are sulpho and R² and R⁴ are H. The third dye is preferably of Formula (2) wherein R¹ and R 4 are H and R² and R³ are sulpho. The fourth dye is preferably of Formula (2) wherein R¹ and R are sulpho and R² and R³ are H.

Preferably the first, second, third and fourth dye each independently constitute 10 to 40 parts, more preferably 15 to 35 parts, especially 20 to 30 parts, more especially approximately 25 parts by weight in each 100 parts in total of the first, second, third and fourth dye.

The dye mixtures used in the present compositions can be prepared by condensing a compound of Formula (3) wherein A and B are as hereinbefore defined with a mixture of first and second compound of Formula (4) wherein R⁶ is as hereinbefore defined, and R¹⁰ is H and R¹¹ is sulpho in the first compound and R¹⁰ is sulpho and R¹¹ is H in the second compound. If desired, halo groups in the resultant composition can be replaced by quaternary ammonium groups by methods known in the art.

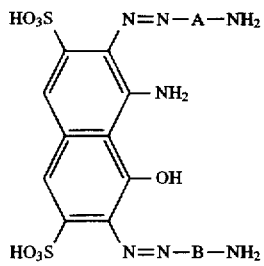

Formula (3)

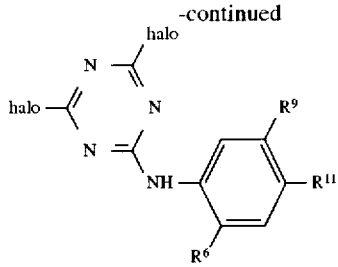

Formula (4)

The condensation is preferably performed at a pH in the range 4 to 8, more preferably 5 to 7. A temperature of 20° to 50° C. is convenient. Normally the condensation is performed in water or an aqueous solvent.

Dyes of Formula (3) can be prepared by diazotising nitroamines of formula H₂N-A-NO₂ and H₂N—B—NO₂ (wherein A and B are as hereinbefore defined) and coupling the resultant diazonium salts onto 1-amino-8-hydroxynaphthalene-3,6-disulphonic acid and reducing the resulting dinitro compound to give a compound of Formula (3). Diazotisation is normally performed below 5° C. using NaNO₂ and dilute mineral acid. Dyes and mixtures of Formula (4) may be prepared by condensing a cyanuric halide with appropriate aniline derivatives.

Where X is a non labile group in Formula (1), the group is preferably introduced to the dye by condensing the di(halotriazine) compound above with a compound of the formula X¹ H in which X¹ is —OR⁹, —SR⁹ or —NR⁷R⁸.

The dyes in the mixture are preferably in the form of their sodium, potassium or lithium salt, or a mixed salt thereof.

As a result of their high water solubility the dye mixtures are useful for the preparation of high strength ink compositions.

The ink composition preferably contains from 0.5% to 20%, more preferably from 0.5% to 15%, and especially from 1% to 10%, by weight of the dyes of Formula (1) based on the total weight of the ink. Although many ink compositions contain less than 5% by weight of dyes, it is desirable that the dyes have a solubility of around 10% or more to allow the preparation of concentrates which may be used to prepare more dilute inks and to minimise the chance of precipitation of dyes if evaporation of the medium occurs during use of the ink. It is preferred that the dyes are dissolved completely in the medium to form a solution.

Ink compositions of the invention colour substrates an attractive green shade and benefit from high solubility in aqueous media. This allows high strength ink compositions to be prepared and gives good storage stability to solutions of normal strength. Furthermore, the dyes used in the ink compositions have good coloration properties, high substantivity, high solubility and are compatible with other reactive dyes such as PROCION™ H-EXL dyes. This compatibility allows binary and ternary mixtures to be made which give consistent dyeings over a variety of different dyeing conditions.

Aqueous-based ink compositions are generally used in office or home printers whereas solvent based ink compositions find use in industrial continuous printers.

It is preferred that the dyes are dissolved completely in the aqueous or solvent medium to form a solution.

When the liquid medium is a mixture of water and one or more water-soluble organic solvent(s), the weight ratio of water to water-soluble organic solvent(s) is preferably from 99:1 to 1:99, more preferably from 99:1 to 50:50 and especially from 95:5 to 80:20.

The water-soluble organic solvent(s) is preferably selected from $C_{1-4}$-alkanols such as methanol, ethanol, n-propanol, isopropanol, n-butanol, sec-butanol, tert-butanol or isobutanol; cyclic alkanols such as cyclohexanol and cyclopentanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkyleneglycols or thioglycols containing a $C_2$–$C_6$-alkylene group such as ethylene glycol, propylene glycol, butylene glycol, pentylene glycol or hexylene glycol and thiodiglycol; polyols such as glycerol or 1,2,6-hexanetriol; $C_{1-4}$-alkyl-ethers of polyhydric alcohols such as 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)-ethoxy]-ethanol; heterocyclic ketones, such as 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligoalkylene-glycols, such as ethyleneglycol, diethyleneglycol, triethyleneglycol; and lower alkyl ethers of polyhydric alcohols such as or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75-95:25-5 and 60-80:0-20:0-20 respectively.

When the medium is a mixture of water and one or more water-soluble solvent(s), it preferably also contains humectant to inhibit evaporation of water and preservative to inhibit the growth of fungi, bacteria and/or algae in the solution. Examples of suitable humectants are, propan-1,2-diol, butan-1,2-diol, butan-2,3-diol and butan-1,3-diol.

Examples of further suitable ink media are given in U.S. Pat. No. 4,963,189, U.S. Pat. No. 4,703,113, U.S. Pat. No. 4,626,284 and EP 4,251,50A which are incorporated herein by reference thereto.

Where the liquid medium is an organic solvent, the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 125° C. Suitable low melting point solids include long chain fatty acids and alcohols, preferably those with $C_{18-24}$ chains, or sulphonamides. The mixture of dyes may be dissolved in the low melting point solid or may be finely dispersed in it.

It is preferred that the medium is a mixture of water and one or more water-soluble organic solvent(s).

The inks may optionally contain other components conventionally used in inks for ink jet printing. For example, viscosity and surface tension modifiers, corrosion inhibitors, kogation reducing additives, and surfactants which may be ionic or non ionic.

A particularly preferred ink composition comprises:

(a) 0.5 to 20 parts of the mixture of dyes of Formula (1);

(b) 2 to 60 parts of water-soluble organic solvent(s); and (c) 1 to 95 parts water.

wherein all parts are parts by weight based upon the total weight of the ink and the parts (a)+(b)+(c)=100.

In addition to the parts (a), (b) and (c) the ink may contain other additional components conventionally used in ink formulations as hereinbefore defined.

According to a second aspect of the present invention there is provided a process for printing a substrate with an ink composition using an ink jet printer, characterised in that the ink composition comprises a mixture of a first, second, third and fourth dye each of which is of Formula (1) or a salt thereof.

A suitable process for the application of an ink compositions as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

A preferred substrate is an overhead projector slide a glass, metal or plastic material or a cellulosic substrate, especially cotton or paper, including plain and treated papers, which may have an acid, alkaline or neutral character.

The preferred ink used in the process is as hereinbefore described.

According to a third aspect of the present invention there is provided a paper or an overhead projector slide or textile material printed with an ink composition according to the first aspect of the present invention, or by means of the process according to the second aspect of the present invention.

According to a fourth aspect of the present invention there is provided a process for the coloration of a textile material with an ink composition according to the first aspect of the present invention which comprises the steps:

i) applying the ink composition to the textile material by ink jet printing; and ii) heating the textile material at a temperature from 50° C. to 250° C. to fix the dye on the material.

The process for coloration of a textile material by ink jet printing preferably comprises a pretreatment of the textile material with an aqueous pre-treatment composition comprising a water-soluble base, a hydrotropic agent and a thickening agent followed by removing water from the pretreated textile material to give a dry pre-treated textile material which is subjected to the ink jet printing in step i) above.

The pre-treatment composition preferably comprises an solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the formation of a covalent bond between the dye and the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The remainder of the pretreatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN™ (available from ICI), which have a strong affinity for the textile material and the dye, even dyes which are unreactive, and thus increase the fixation of the dye on the textile material.

Examples of anti-migration agents are low molecular weight acrylic resins, e.g. polyacrylates, such as poly(acrylic acid) and poly(vinyl acrylate).

Where the dye contains a halotriazine reactive group, it has been found that the yield of dye fixed to the textile material can be improved by the addition to the pre-treatment composition of certain tertiary amines which are capable of interacting with the reactive group so as to replace the halogen atom and form a quaternary nitrogen leaving group, corresponding to the tertiary amine, which is displaced during fixation reaction of the dye with the textile material. It is therefore a preferred feature of the present process that the pre-treatment composition also contains such a tertiary amine. Any tertiary amine may be used, but preferred tertiary amines are substantially odourless compounds such as 1,4-diazabicyclo[2.2.2]octane (DABCO) and substituted pyridines, preferably carboxypyridines, and especially those in which the pyridine ring is substituted by a carboxylic acid group in the 3 or 4 position, such as nicotinic or isonicotinic acid.

However, when further agents are added to the pre-treatment composition, care must be taken to balance their effects and to avoid interactions with the other ingredients of the composition.

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Where the dye contains a reactive group which is labile even in a neutral environment, hydrolysis of the reactive group on the dye in the aqueous composition and during the fixation can be inhibited by use, as humectant, of a glycol or mixture of glycols, in which not more than one hydroxy group is a primary hydroxy group. Examples of suitable humectants are as hereinbefore defined. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pre-treated textile material removal of water is preferably by heat, such as by exposure to hot air or to infrared or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to effect reaction between the dye and the fibre and thereby to fix the dye on the textile material. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pre-treatment and dye compositions may be removed from the textile material by a washing sequence, involving a series of hot and cold washes in water and aqueous detergent solutions before the textile material is dried.

According to a fifth aspect of the present invention there are provided textile materials, especially cellulosic textile materials, coloured by means of the a process according to the fourth aspect of the present invention.

According to a sixth feature of the present invention there is provided a toner resin composition comprising a toner resin and a dye mixture characterised in that the dye mixture comprises a first, second, third and fourth dye of Formula (1).

The toner resin is a thermoplastic resin suitable for use in the preparation of toner compositions. A preferred toner resin is a styrene or substituted styrene polymer or copolymer such as polystyrene or styrene-butadiene copolymer, especially a styrene-acrylic copolymer such as a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5143809, UK 2090008, U.S. Pat. No. 4206064 and U.S. Pat. No. 4407928.

The toner resin composition preferably contains from 0.1% to 20% of the dye mixture comprising a first, second, third and fourth dye of Formula (1) more preferably from 3% to 10% based on the total weight of the toner resin compositions.

The toner resin composition may be prepared by any method known to the art which typically involves mixing the toner resin with the dye mixture comprising a first, second, third and fourth dye of Formula (1) and optionally a charge control agent (CCA) by kneading in a ball mill above the melting point of the resin. Generally, this involves mixing the molten toner resin composition for several hours at temperatures from 120° to 200° C., in order to uniformly distribute the optional CCA and dye throughout the toner resin. The toner resin is then cooled, crushed and micronised until the mean diameter of the particles is preferably below 20 µm and, for high resolution electro-reprography, more preferably from 1 to 10 µm. The powdered toner resin composition so obtained may be used directly or may be diluted with an inert solid diluent such as fine silica by mixing for example in a suitable blending machine.

CCA's are more fully described in WO94/23344.

The invention is further illustrated by the following examples.

EXAMPLE 1

Stage a)

A dyebase of the formula (5) was prepared by following the exemplified method of GB 1,387,925.

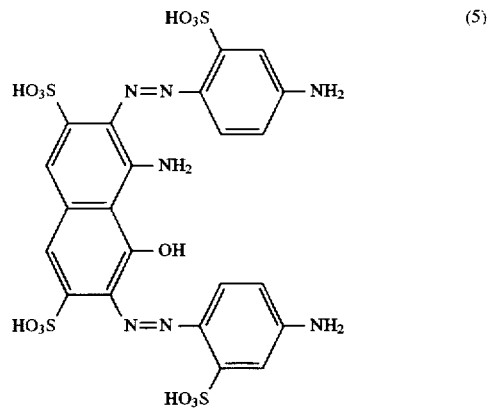

(5)

Stage b)

Cyanuric chloride (54.8 mmol) was dissolved in acetone and poured onto ice. 2-Methyl-4-sulphoaniline (24.9 mmol) and 2-methyl-5-sulphoaniline (24.9 mmol) were dissolved together in water at pH7 and added dropwise to the cyanuric chloride suspension at 0°–5° C., pH 6. The mixture was stirred for 1 hr, screened and then added to a screened solution of the product from stage a) (22.6 mmol) dissolved in water at pH 6. The mixture was stirred for 5 hours at 40° C., cooled to room temperature and salted to 15% w/v using NaCl. The resultant precipitate was filtered-off, dissolved in water and dialysed to remove unwanted salts. Removal of water by evaporation gave a composition containing four dyes of formula (2) (31.0g) in a weight ratio of roughly 1:1:1:1:

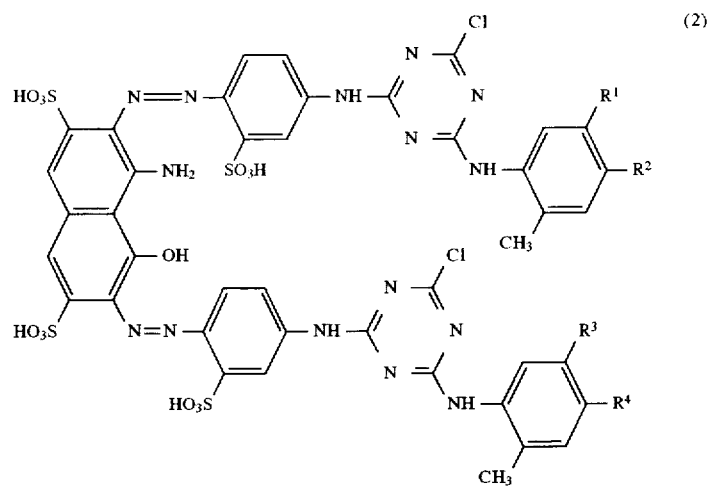

(2)

Wherein in the first dye $R^1$ and $R^3$ are H and R and $R^4$ are sulpho; in the second dye $R^1$ and $R^4$ are H and $R^2$ and $R^3$ are sulpho; in the third dye $R^2$ and $R^4$ are H and $R^1$ and $R^3$ are sulpho; and in the fourth dye $R^1$ and R are sulpho and $R^2$ and $R^3$ are H.

Comparative Solubility Measurements

By way of comparison stages a) and b) were repeated except that in place of a mixture 2-methyl-4-sulphoaniline and 2-methyl-5-sulphonaniline there was used the individual anilines. The two resultant dyes had the structures shown below:

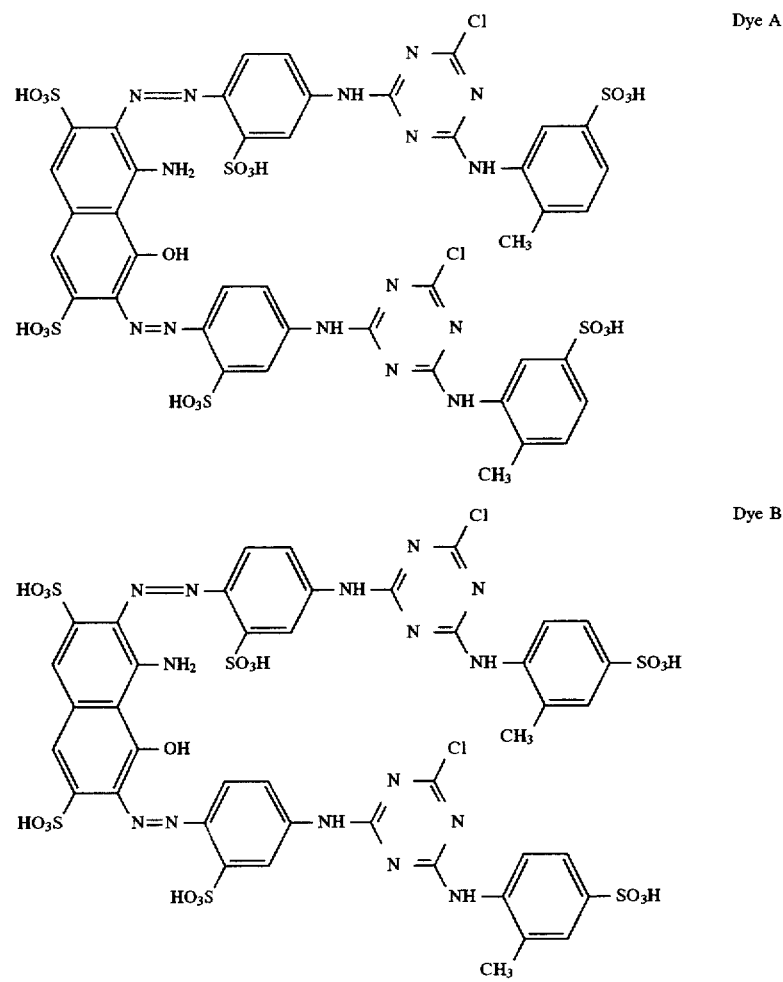

The solubilities of Dyes A, B and the four-component composition from Stage b) in water at 20° C. were as follows:

| Dye | Solubility |
| --- | --- |
| Mixture from Stage b) | 14% |
| Dye A | 8% |
| Dye B | 2% |

EXAMPLES 2 TO 11

Approximately 1:1:1:1 mixtures of dyes of the formula:

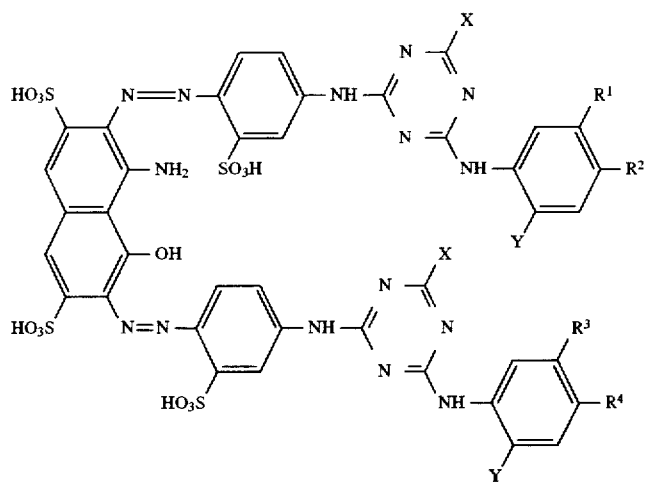

wherein:

X and Y are as shown in Table 1; and in the first dye $R^1$ and $R^3$ are H and $R^2$ and $R^4$ are sulpho;

in the second dye $R^1$ and $R^3$ are sulpho $R^2$ and $R^4$ are H;

in the third dye $R^1$ and $R^4$ are H and $R^2$ and $R^3$ are sulpho, and in the fourth $R^1$ are $R^4$ are sulpho and $R^2$ and $R^3$ are H;

may be prepared using an analogous method to that described in Example 1. Where X is other than -Cl, the di(chlorotriazine) dyes resulting from the process of Example 1 are condensed with the compound HX shown in Table 2 to give the desired dye mixture.

Where X is —OH, the di(chlorotriazine) dyes produced using the process of Example 1 may be hydrolysed by heating an aqueous solution of the dyes under alkaline conditions.

TABLE 1

| Example | Y | X | XH |
| --- | --- | --- | --- |
| 2 | —CH₃ | —OH | H₂O |
| 3 | —C₂H₅ | —OH | H₂O |
| 4 | —C₂H₅ | —Cl | — |
| 5 | —C₃H₇ | —OH | H₂O |
| 6 | —C₃H₇ | —Cl | — |
| 8 | —CH₃ | —NH(C₂H₄OH) | 2-aminoethanol |
| 9 | —CH₃ | -Piperazinyl | Piperazine |
| 10 | —CH₃ | -Morpholinyl | Morpholine |
| 11 | —CH₃ | —N(C₂H₄OH)₂ | di-(hydroxyethyl)amine |

EXAMPLE 12

Inks containing the dye mixtures of Examples 1 to 11 may be formulated as shown in Table 2.

EXAMPLE 13

The ink compositions shown in Table 2 may be applied to a textile material such as cotton using an ink jet printer. Preferably the textile is pre-treated with a composition comprising:

2.5 parts sodium bicarbonate;

15 parts of a 10% aqueous solution of sodium alginate thickening agent;

15 parts of urea;

47.5 parts of water; and 20 parts of Composition A shown in Table 3.

TABLE 3

Composition A

| Component | Parts by Weight |
| --- | --- |
| Urea | 25 |
| Distearyl Dimethyl Ammonium Chloride | 2.3 |
| Isopropryl Alcohol | 0.8 |
| Castor Oil + 2.5 Ethylene Oxide | 2.2 |
| Castor Oil + 4.0 Ethylene Oxide | 0.36 |
| Sodium Lauryl Sulphate | 0.010 |
| Methanol | 0.007 |
| Formaldehyde | 0.0001 |
| Tallow Amine + 15 Ethylene Oxide | 0.25 |
| Acetic Acid (80%) | 0.05 |
| Water | 69.0 |

Textile material should be thoroughly soaked with the pre-treatment composition in a padding bath and the excess liquor removed by mangling. The material should then be dried in hot air at 100° C. prior to application of the inks shown in Table 2 by an ink jet printer.

After application of the ink, the printed textile may be heated at a temperature of 100° to 200° C. to fix the dye on the material.

TABLE 2

| Dye Mixture From Example No. | Dye Content | Water | PG | DEG | NMP | DMK | PHO | CET | IPA | MEOH | 2P | MIBK | BAS |
|---|---|---|---|---|---|---|---|---|---|---|---|---|---|
| 1 | 2.0 | 80 | 5 | | 6 | 4 | | | | | 5 | | 3 |
| 2 | 3.0 | 90 | | 5 | 2 | | 0.2 | | | | | | |
| 3 | 1.0 | 85 | 5 | | 2 | 2 | | 0.1 | | 5 | 1 | | |
| 4 | 2.1 | 91 | | 8 | | | | | | | | 1 | |
| 5 | 3.1 | 86 | 5 | | | | | 0.2 | 4 | | | 5 | |
| 6 | 1.1 | 81 | | | 9 | | 0.5 | 0.5 | | | 9 | | |
| 7 | 2.5 | 60 | 4 | 15 | 3 | 3 | | | 6 | 10 | 5 | 4 | |
| 8 | 1.9 | 70 | | 20 | | | | 10 | | | | | |
| 9 | 2.4 | 75 | 5 | 4 | | | | | | 6 | | 5 | 5 |
| 10 | 4.1 | 80 | 3 | 5 | 2 | 10 | | 0.3 | | | | | |
| 11 | 3.2 | 65 | | 5 | 4 | 6 | | | 5 | 4 | 6 | 5 | |
| 2 | 4.6 | 96 | | | | | | | | 4 | | | |
| 3 | 0.8 | 90 | 5 | | | | | | 5 | | | | |
| 4 | 1.2 | 80 | 2 | 6 | 1 | 5 | | | 1 | | 4 | | 1 |
| 5 | 1.8 | 80 | | 5 | | | | | | | 15 | | |
| 6 | 2.6 | 84 | | | 11 | | | | | | 5 | | |
| 7 | 3.3 | 80 | 2 | | | 10 | | | | 2 | | 6 | m |
| 8 | 1.7 | 90 | | | | 7 | 0.3 | | 3 | | | | |
| 9 | 1.5 | 69 | 2 | 20 | 2 | 1 | | | | | 3 | 3 | |
| 10 | 1.6 | 91 | | | 4 | | | | | | 4 | | 1 |
| 1 | 10.0 | 70 | 5 | | 6 | 4 | | | | | 5 | | |
| 2 | 8.0 | 85 | | 5 | 2 | | | | | | | | |
| 3 | 12.0 | 77 | 5 | | 2 | | | | 2 | | 2 | | |
| 4 | 9.0 | 76 | | 10 | 2 | | | | | | 3 | | |
| 5 | 11.5 | 77.3 | 5 | | | | | 0.2 | | | 1 | 5 | |
| 6 | 7.0 | 80 | | | 9 | 1 | | | | | 3 | | |
| 8 | 10.4 | 64.6 | | 15 | | | | | 10 | | | | |
| 10 | 8.5 | 73 | 2 | 6 | 1 | 5 | | | | | 4 | | 0.5 |
| 11 | 12.5 | 75 | | | | 8 | 0.5 | | 4 | | | | |
| 3 | 10.0 | 70 | | | 10 | | | | | | 12 | | |
| 9 | 11.0 | 73 | 5 | | 6 | | | | | | 5 | | |
| 5 | 10.0 | 40 | 4 | 15 | 3 | 3 | | | 6 | 10 | 5 | 4 | |

We claim:

1. An ink composition comprising a medium comprising at least one of a low melting point solid, an organic solvent and a mixture of water and one or more water-soluble organic solvent(s); and a mixture of a first, second, third and fourth dye, each of which is of Formula (1) or a salt thereof:

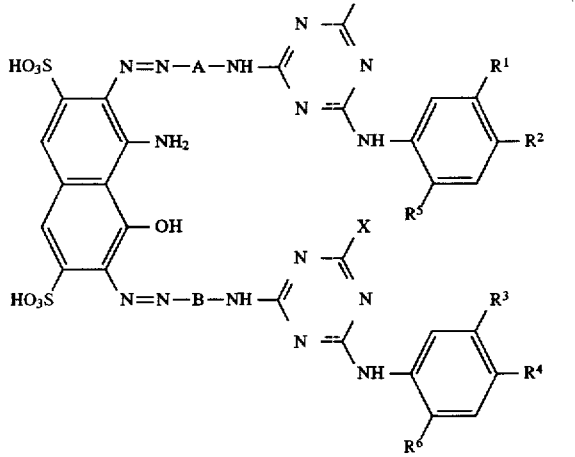

Formula (1)

wherein:

X is a labile or non labile atom or group;

A and B are each independently an optionally substituted phenylene group;

one of $R^1$ and $R^2$ is H and the other is sulpho;

one of $R^3$ and $R^4$ is H and the other is sulpho;

$R^5$ and $R^6$ are each independently $C_{1-4}$-alkyl; and the first, second, third and fourth dye are different from each other.

2. An ink composition according to claim 1 wherein X in Formula (1) is a labile atom or group.

3. An ink composition according to claim 2 wherein the first dye is of the Formula (2):

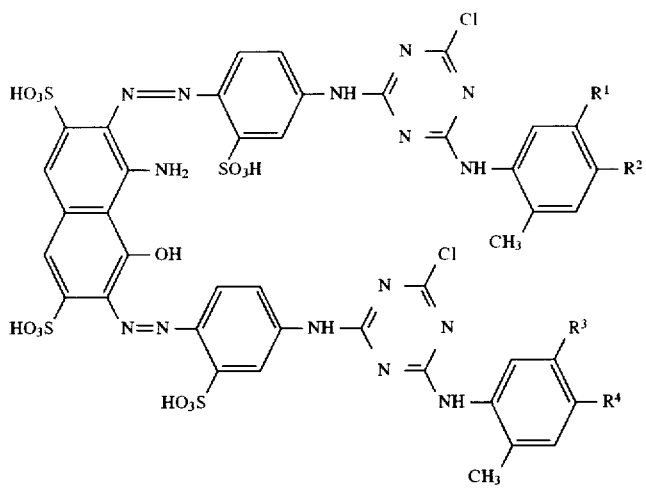

Formula (2)

wherein:

R¹ and R³ are H and R² and R⁴ are sulpho;

the second dye is of the Formula (2) wherein R¹ and R³ are sulpho and R² and R⁴ are H;

the third dye is of Formula (2) wherein R¹ and R⁴ are H and R² and R³ are sulpho; and the fourth dye is of Formula (2) wherein R¹ and R⁴ are sulpho and R² and R³ are H.

4. An ink composition according to claim 3 wherein the medium comprises water and one or more water-soluble organic solvent(s).

5. An ink jet printing process for printing a substrate with an ink composition comprising forming the ink into small droplets by ejection from a reservoir through a small orifice so that the droplets of ink are directed at the substrate wherein the ink composition is as defined in any one of claims 1 to 4.

6. A paper or an overhead projector slide or a textile material printed with an ink composition according to any one of claims 1 to 4.

7. A process for the coloration of a textile material with an ink composition according to any one of claims 1 to 4 which comprises the steps :

i) applying the ink composition to the textile material by ink jet printing; and ii) heating the textile material at a temperature from 50° C. to 250° C. to fix the dye on the material.

8. A textile material coloured by means of the process according to claim 7.

9. A toner resin composition comprising a toner resin and a dye mixture wherein the dye mixture comprises a first, second, third and fourth dye as defined in any one of claims 1 to 3.

10. A paper or an overhead projector slide or a textile material printed by means of the process according to claim 5.

11. An ink composition according to claim 1 wherein A and B are each independently sulphophenylene.

12. An ink composition according to claim 1 wherein each X independently is a non-labile atom or group.

* * * * *